United States Patent [19]

Hartger et al.

[11] 3,949,528

[45] Apr. 13, 1976

[54] STORAGE ENCLOSURE FOR BICYCLES, MOTORCYCLES, OR THE LIKE

[75] Inventors: Richard W. Hartger; John M. Perry, II, both of Grand Rapids, Mich.

[73] Assignee: Harold V. Hartger, Grand Rapids, Mich. ; a part interest

[22] Filed: July 3, 1974

[21] Appl. No.: 485,608

Related U.S. Application Data

[63] Continuation of Ser. No. 323,657, Jan. 15, 1973, abandoned.

[52] U.S. Cl. .......................... 52/79; 52/66; 52/174; 217/37
[51] Int. Cl.[2] .... E04G 1/12; E04B 7/16; E04H 6/08
[58] Field of Search ............ 52/79, 174, 66; 217/37, 217/38; 49/203, 204; 211/17, 20; 312/199, 293, 327

[56] References Cited
UNITED STATES PATENTS

| | | | |
|---|---|---|---|
| 542,096 | 7/1895 | Mumford | 217/37 |
| 2,566,554 | 3/1971 | Schaffer et al. | 52/79 |
| 2,742,674 | 4/1956 | Melder | 52/64 |
| 2,987,355 | 6/1961 | Sandefur | 312/328 |
| 3,438,158 | 4/1969 | Kane | 52/174 X |
| 3,665,661 | 5/1972 | Beckerer | 52/200 |
| 3,734,272 | 5/1973 | Galen | 217/37 |
| 3,796,015 | 3/1974 | Kane | 52/64 |

FOREIGN PATENTS OR APPLICATIONS

| | | | |
|---|---|---|---|
| 870,081 | 3/1942 | France | 52/64 |
| 233,109 | 5/1925 | United Kingdom | 52/66 |
| 173,544 | 12/1952 | Austria | 52/64 |
| 107,466 | 7/1898 | Germany | 217/38 |
| 815,100 | 9/1951 | Germany | 52/174 |
| 185,078 | 9/1936 | Switzerland | 52/174 |
| 146,797 | 7/1931 | Switzerland | 52/174 |
| 238,101 | 10/1945 | Switzerland | 52/174 |
| 41,712 | 10/1965 | Germany | 52/79 |
| 456,010 | 3/1950 | Italy | 52/174 |

*Primary Examiner*—Ernest R. Purser
*Assistant Examiner*—Leslie A. Braun
*Attorney, Agent, or Firm*—Price, Heneveld, Huizenga & Cooper

[57] ABSTRACT

A storage enclosure especially adapted for the protective storage of bicycles, motorcycles and the like comprising molded modules which may be used alone or in combination with other of the same modules to form a multiple compartment enclosure. Each module is individually accessible without need for bending or stooping over while guiding a bicycle or motorcycle into the enclosure via an aperture extending a substantial distance toward the front of the enclosure and covered by a vertically opening door. Within a preferred embodiment, the end walls and/or side wall of each module are tapered outwardly to allow compact stacking of the individual modules for storage and/or transportation.

17 Claims, 8 Drawing Figures

AREA INCLUDING HEAD OF PERSON GUIDING BICYCLE OR MOTORCYCLE, INTO ENCLOSURE COMPLETELY

STORAGE ENCLOSURE FOR BICYCLES, MOTORCYCLES, OR THE LIKE

This application is a continuation of copending application Ser. No. 323,657, filed Jan. 15, 1973, now abandoned.

This application relates to storage enclosures, and more particularly, to storage enclosures especially adapted to store bicycles, motorcycles, and the like, to prevent theft, vandalism, and adverse effects from the weather.

BACKGROUND OF THE INVENTION

Recent years have seen a large increase and growth in the use of bicycles and motorcycles especially in and around college campuses. Accompanying this growth are the attendant problems of theft and vandalism of the bicycles and motorcycles, not to mention the problem of conveniently protecting such two-wheeled vehicles against the effects of rain, snow, sleet and other adverse weather conditions. These problems are most accute on college campuses where large numbers of permanent structures capable of being locked for protective storage of such vehicles are either few in number or totally unavailable to the great majority of college students. Similarly, in other areas it is both inconvenient and too expensive to provide a permanent structure devoted solely to the storage of bicycles and motorcycles. The present invention solves these problems by providing an enclosure which is adapted to be used as a permanent structure and yet is conveniently sized and light enough to be portable for easy transportation from place to place. The enclosure may be locked to prevent theft and vandalism and completely encloses the bicycle and/or motorcycle to protect against weather conditions.

Although other storage enclosures have been proposed in the past, they often have been large, bulky structures not well suited to the storage of a number of smaller, individually owned items such as most bicycles and motorcycles. Further, certain of the prior art structures have not been well adapted to facilitate portability and have, therefore, been difficult and expensive to store during non-use and to transport from place to place. The present invention was conceived and invented as an answer to these and other related problems.

SUMMARY OF THE INVENTION

It is the purpose of the present invention to provide a storage enclosure comprising individual modules which are adapted for use either alone or in combination with other similar modules to form a compartmentalized storage enclosure having individual access to each separately lockable compartment. A related purpose is to provide a portable, permanent storage structure which is higher than a bicycle or motorcycle, lower than the height of the normal or average sized person and yet which is easily entered and provides access for guiding a bicycle or motorcycle thereinto without it being necessary for the entering person to bend or stoop over. Further, in one form, the present invention provides individual storage modules which may be compactly stacked when not in use or for transportation purposes, thereby providing a great saving in space and expense. Additionally, in another form, the compartmentalized storage enclosure provides divided, individually accessible, individually lockable areas for the storage of items such as bicycles and/or motorcycles in an easy and convenient manner without it being necessary to open or provide access to adjoining compartments in the same structure.

In accordance with these and other objects and purposes, the present invention provides a storage enclosure module having a roof, two downwardly depending, integral end walls and at least one downwardly depending, integral side wall. The roof of the module is high enough to admit bicycles and/or motorcycles thereunder, but is lower than the height of an average size adult person. Access to the storage module is provided without requiring the person entering therein to bend or stoop over via an opening or aperture which extends continuously from the bottom of one end wall vertically for the full height thereof and merges into the continuation thereof extending approximately one-half the length of the roof in a direction parallel to the side wall. The access opening or aperture is covered by a door, preferably L-shaped, which is hingedly secured to the roof adjacent the end of the access opening such that it opens generally vertically over the aperture.

In the preferred embodiments, the side wall and/or end walls of the individual modules taper outwardly and downwardly from the generally horizontally extending roof section such that they are inclined between the surface supporting the storage enclosure and the roof. The tapered walls provide a means for compactly stacking the individual modules one atop the other for storage and/or transportation purposes. Each of the L-shaped doors is shaped to correspond to the taper angle between the end walls and roof. Further, each of the generally L-shaped doors includes a peripheral flange which is tapered outwardly from the integral panels thereof to provide a means for stacking the doors apart from the modules for storage or transportation purposes.

The individual modules may be used as free-standing, individual enclosures for one bike or motorcycle by securing a generally planar side panel to the open side of one of the individual modules. A plurality of the modules may be secured together to provide a compartmentalized, divided, storage enclosure by securing the flange along the open side of one module to the integral side wall of the next and so on until as many compartments are provided as desired. Each compartment of this combined structure may be entered individually without access to the remaining compartments. Locking and latching means are provided to prevent unauthorized entry into the compartments.

An additional optional feature is the provision of a floor in each module, the floor including bicycle or motorcycle support means comprising spaced guide runners including upstanding panels at one end thereof. The guide runners receive therebetween the wheels and tires of the bicycle or motorcycle while the upstanding panels supportingly engage one of the wheels of the bicycle or motorcycle to prevent it from tipping or falling over within the enclosure. Although the bicycles and motorcycles may be walked and guided into an individual compartment via the access aperture or opening, it is also possible to push the two-wheeled vehicle into the compartment from outside the storage enclosure through the aperture via the guide runners.

These and other objects, advantages, purposes, and features of the invention will become more apparent from a study of the following description taken in con-

3 junction with the drawings.

BRIEF DESCRIPTION OF THE DRAWINGS

FIG. 5 is a side elevation of the end module of FIG. 4 with the end panel thereof broken away to show the bicycle support means supporting a bicycle therein;

DESCRIPTION OF THE PREFERRED EMBODIMENT

Figure 1:
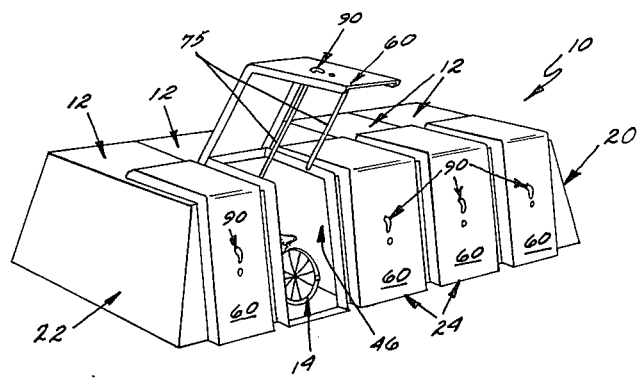
FIG. 1 is a perspective view of a compartmentalized storage enclosure formed from a plurality of the individual storage enclosure modules of the present invention.

Referring now to the drawings in greater detail, FIG. 1 shows the storage enclosure 10 of the present invention including a plurality of individual compartments or modules 12 designed for the storage of two-wheeled vehicles such as a bicycle 14, motorcycle or other similar sized vehicles or the like. Each of the modules includes a similar entrance or access opening 46 covered by one of the generally L-shaped door closures 60. Telescoping support struts 75 bias the doors toward the open position while locking latch means 90 on each door retain the doors in the closed position. As will be explained more fully below, each of the modules may be used to form a single storage enclosure or in combination as shown in FIG. 1. Further, given the easy access to the modules via the access to the openings or apertures 46, many other types of goods and materials besides bicycles and motorcycles may be easily stored and protected within the single or multiple enclosures.

Figure 2:
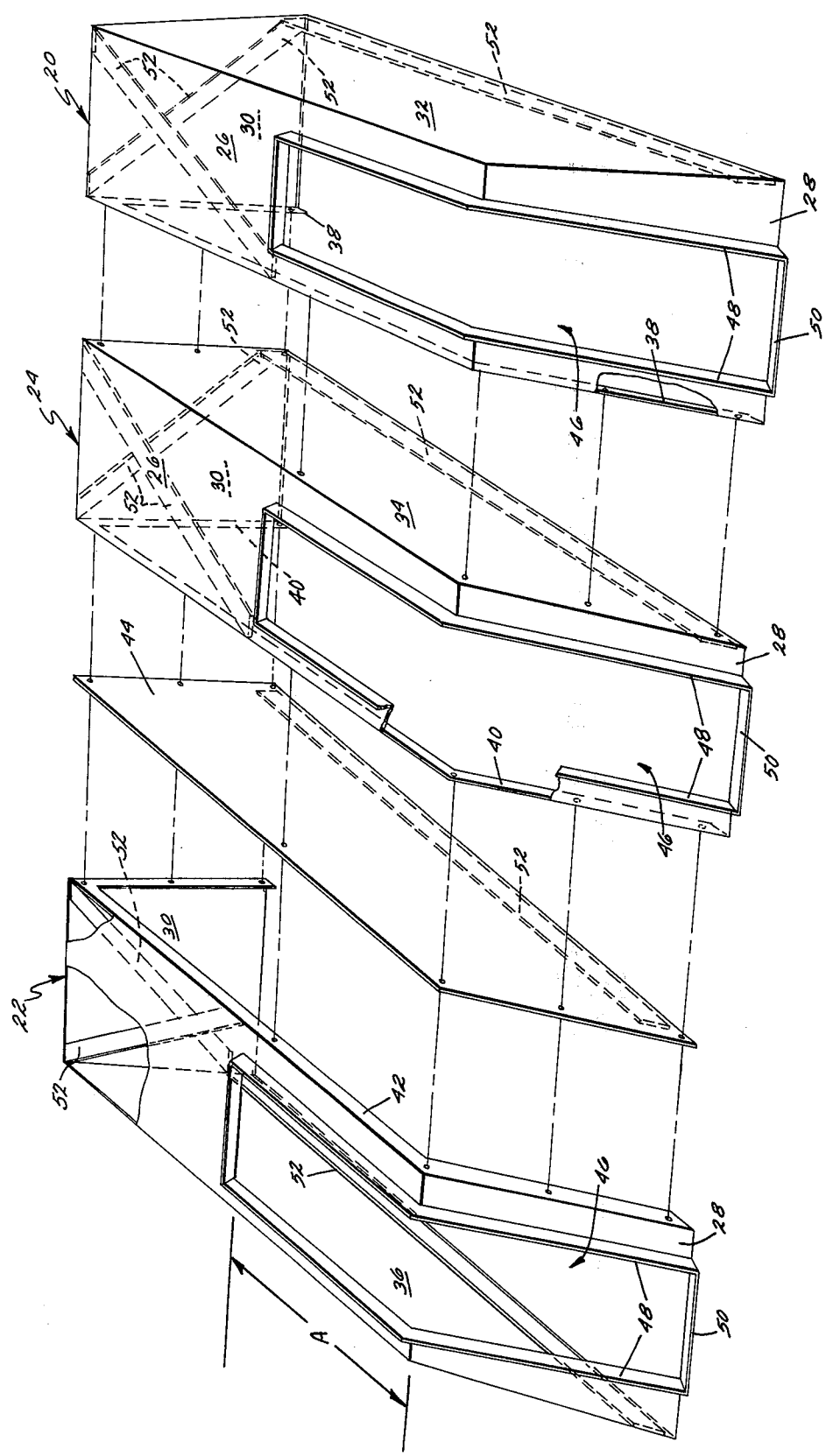
FIG. 2 is a perspective, fragmentary, exploded view of the storage enclosure of FIG. 1 showing the individual storage enclosure modules without the generally L-shaped doors in place.

As shown in FIG. 2, the individual modules comprise three different types including right and left-hand modules 20 and 22 and center or intermediate modules 24. Each of the modules comprises a molded shell of lightweight, glass fiber reinforced resinous plastic having a generally horizontally extending roof 26 and generally downwardly depending integral end walls 28 and 30. Although molded fiber reinforced, resinous plastic is preferred, the modules may also be formed from other materials such as stamped aluminum, plywood or the like. Generally any of the materials used is weather resistant. However, even weather susceptible materials may be used if painted or otherwise coated for protection.

Each of the modules also includes a downwardly depending integral side wall. Thus, the right-hand module 20 includes right side wall 32, and the central module 24 includes right side wall 34, each of which extends over the entire area between the end walls, roof, and the surface supporting the storage enclosure. Further, the left end module includes a depending side wall 36 also extending over the entire area between end walls, roof, and the surface supporting the module on the left-hand side of the module.

On the side of each module opposite the downwardly depending side wall, a downwardly depending, continuous flange or partial side wall extends along the edge of the module following the periphery thereof along both end wall edges and the roof edge. Thus, right end module 20 includes a connecting flange 38, and left end module 22 includes connecting flange 42. As will be described more fully below, these connecting flanges are used either to secure a plurality of the individual modules together to form a compartmentalized storage enclosure 10, such as that shown in FIG. 1, or to secure thereto a separate panel for individual use of a single module.

As best seen in FIGS. 2–5, each of the modules also includes an opening or aperture 46 providing easy and convenient access to the interior of each of the modules without requiring the average sized adult person to bend or stoop over. The openings or apertures 46 are formed along the full height of the end walls 28 and merge into a continuation thereof in the roof sections 26. In the preferred embodiment, the aperture 46 extends into the roof 26 of each module a distance A (FIGS. 2 and 5) which distance is approximately equivalent to one-half the overall length of the maximum length B of each module. Of course, the aperture may extend further than the midpoint of the module so that other sizes of bicycles may be guided into and stored therewithin. Each module includes an upstanding peripheral flange 48 which outlines the entire edge of the aperture 46. Flange 48 is inclined slightly inwardly, preferably at approximately 100°, over the aperture to facilitate cooperation with and the closing of the generally L-shaped door 60 and with the stacking of the individual modules as will be described below.

A foot plate or brace 50 (FIGS. 2–4) is included on each module and extends between the flanges 48 adjacent the surface supporting the module to retain the flanges and sides of the modules properly spaced apart thereby strengthening and reinforcing the module. Further, the molded modules are preferably reinforced under the roofs and along the end and/or side walls with reinforcing slats or members 52 as shown in FIGS. 2–5. These members are placed either diagonally on the inside of the various module areas or parallel to an edge of the respective roof, end or side wall, as is shown. Members 52 are formed from wood, metal or another strong, rigid material and provide strength, rigidity and structural integrity for the modules.

Figure 4:
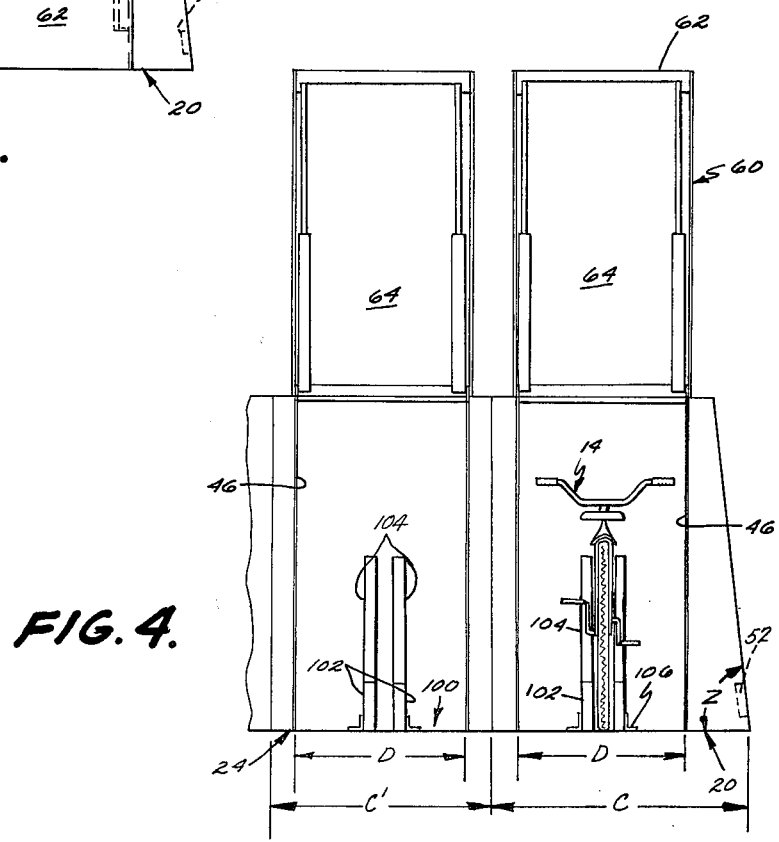
FIG. 4 is a fragmentary, front elevation of one end of the storage enclosure of FIG. 1 similar to that of FIG. 3 but with the generally L-shaped doors being open and showing a bicycle support means secured to a floor structure included in each of the individual compartments.

Each of the apertures 46 on each module is covered by a generally L-shaped door closure 60 (FIGS. 1, 4 and 5). Each door includes two integral panels 62 and 64 also preferably molded from the lightweight, glass fiber reinforced resinous plastic utilized to mold the modules 20, 22 and 24. Each door 60 also includes a flange 66 extending continuously around the periphery of the entire door except for along the bottom edge 68.

Flange 66 is cut away along the bottom edge as shown in FIG. 4. Further, flange 66 is flared outwardly, at an angle of approximately 100°, so that it will cooperate and seat on the flange 48 outlining the periphery of the apertures 46.

Figure 8:
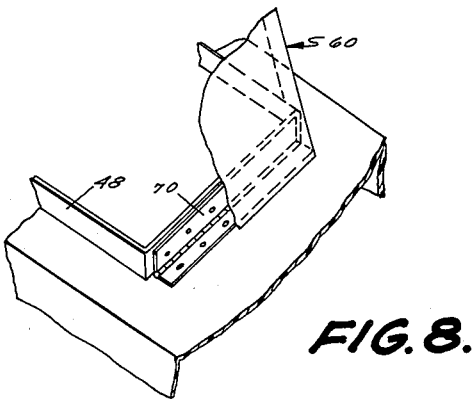
FIG. 8 is a fragmentary perspective view of a portion of the roof of an individual module showing the hinged connection between the module and the generally L-shaped door.

Each of the doors 60 is hingedly secured via a piano or other similar type hinge 70 (FIG. 8) adjacent the end of aperture 46 along roof 26. Preferably, the hinge is secured to the flanges 48 and 66 as shown in FIG. 8 such that it will be hidden from view when door 60 is closed. Doors 60, therefore, open generally vertically over the expanse of aperture 46 as shown in FIGS. 1, 4 and 5. Telescoping or other similar struts 75 are pivotally secured between aperture flange 48 and door flange 66. These struts 75 are spring biased to approximately counterbalance the weight of door 60 and to slightly bias the doors into their open position. When closing the door, the force of the biasing spring in the struts may be easily overcome by the person closing the door. Thereafter, the struts pivot downwardly with the door which is latched in its closed position via a locking latch apparatus 90 described hereinafter.

Figure 3:
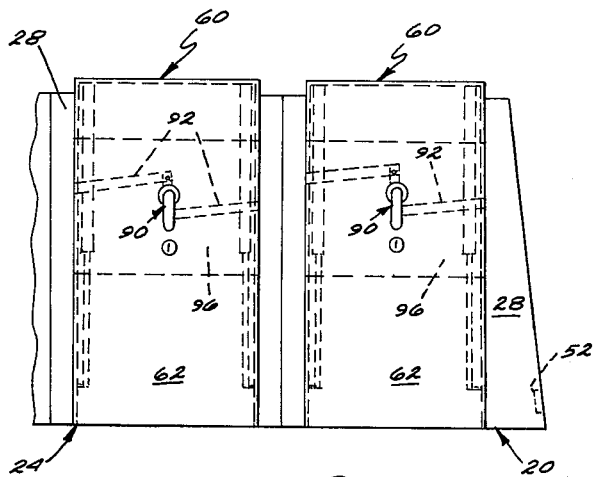
FIG. 3 is a fragmentary, front elevation of one end of the storage enclosure of FIG. 1 showing a center module and an end module thereof with the generally L-shaped doors being closed.

Locking latch apparatus 90 comprises a conventionally known latch structure of the type commonly used on garage doors. The apparatus preferably includes offset latching bars 92 (FIG. 3) inserted and withdrawn from apertures 94 in flanges 48 (FIG. 5), and is secured on panel 62 of door 60, as shown in FIG. 3. Panel 62 preferably is reinforced by a separate panel 96 of wood or the like secured to the inside of back surface thereof in order to strengthen the molded door.

In the preferred embodiment of the invention, each module 20, 22, or 24 has a length dimension B greater than its widthwise dimensions C (for end modules 20 and 22) or C' (for center modules 24) as shown in FIGS. 4 and 5. The apertures 46 are of substantially equivalent size in each module, their width preferably being constant and represented by D in FIG. 4. This width D is, of course, less than the widths C or C' of the end walls 28 in which the apertures are formed but wide enough to allow the handlebars of bicycles and motorcycles to pass therethrough (see FIG. 4). Further, the height of each module is equivalent as represented by E in FIG. 5. The height, when measured from the bottom edges of the side and end walls, is preferably greater than the height of an adult bicycle or motorcycle but less than the height of the average or normal size adult person. In this respect, the average adult bicycle is considered for purposes of this description to be approximately 6 to 6½ feet long, 3½ to 3¾ feet high (at its highest point), and 1½ to 2 feet wide (at its widest point), while the normal adult person is between approximately 4½ and 6 feet tall. Consequently, the preferred size for the modules is approximately 7 to 8 feet long, approximately 4 feet high and approximately 3 to 3½ feet wide. The apertures 46 are approximately 2 to 2½ feet wide in the preferred embodiment.

When door 60 is opened, there is sufficient clearance under the raised door to allow the normal or average size person to walk into the interior of the module through aperture 46. Such a person can thus guide his bicycle or motorcycle completely into the enclosure by either walking or standing adjacent the vehicle or straddling it, without any obstruction from the roof. Thus, a person need not bend or stoop over to guide his bicycle into the enclosure. Typically, the head of the person guiding the cycle into the module is positioned at least partially above the roof level but below the door in its raised position as shown in FIG. 5. Further, when the typical adult bicycle or motorcycle is received completely therewithin, with its front wheel closer to the fixed end wall 30 than its rear wheel (see FIG. 5), the edge 47 of aperture 46 in roof 26 is closer to wall 30 (distance J in FIG. 5) than is the front extremity of the seat on the bicycle or motorcycle (distance K in FIG. 5). This is true even for tandem or multiple seat bicycles or motorcycles wherein the length of the aperture in the roof extends past the seat which is forwardmost (closest to the front wheel) or closest to fixed wall 30 when the cycle is received in the enclosure. Thus, an area vertically over at least the forwardmost seat and the remaining rear portion of the bicycle is provided to allow the bicycle to be easily and conveniently guided into the structure by a person without obstruction from the roof. Moreover, it is not necessary for the person to completely enter the area of the structure which is normally enclosed.

Accordingly, the enclosure structure of this invention greatly facilitates the rolling of bicycles and motorcycles or the carrying of other items to be stored into the storage modules. Moreover, given the length B of the aperture 46 in roof 26, which is at least substantially one-half the length of the overall module as mentioned above, it is possible to place items to be stored in substantially all areas of the interior of the enclosure module via aperture 46.

Normally, the storage enclosure or individual modules of the present invention are intended for use on a generally planar concrete or asphalt pad or other hard surface to which the enclosure may be securely connected via conventionally known means such as concrete nails, bolts, or the like. However, should it be necessary to utilize the enclosure on an undeveloped area or uncovered ground, a floor structure or panel 100 is included in each of the modules. Floor panels 100 may be produced from the same resinous, glass fiber reinforced plastic material as is the remainder of the module or may be made from other materials such as marine plywood or the like. As shown in FIGS. 4 and 5, floor panel 100 is of a size corresponding to the cross-sectional area of the respective module in which it is to be used along the bottom edges thereof and preferably includes parallel guide runners 102 having integral upstanding support panels 104 which are spaced apart a sufficient distance to respectively guide and support the wheels and tires of a bicycle or motorcycle received therebetween. Runners 102 and support panels 104 are secured to panel 100 via conventionally known means such as L-brackets 106. Consequently, once the door 60 has been opened on each individual module, a bicycle or motorcycle may be pushed and guided into the storage enclosure via the guide runners 102 and supported in an upright position via the supporting panels 104 without any additional structure. Although the extension of the aperture or opening 46 into the roof 26 allows the cycle to be walked into the enclosure, it is also possible to merely push the cycle into the enclosure through the portion of the aperture in end wall 28 while standing outside of the enclosure via the guide runners 102. Runners 102 and panels 104 prevent the cycle from turning or falling within the structure. The floor panels 100 themselves may be secured to reinforcing members 52 or to the side and end walls via conventionally known means such as bolts or brackets 108 (FIG. 5). The floor thus fits inside the enclosure flush with the bottom edges thereof.

In the preferred embodiment of the invention, both end walls 28 and 30 on each module are tapered or inclined outwardly and downwardly from roof 26 at an obtuse angle X (FIG. 5) such that they form inclined surfaces or planar areas extending between the surface supporting the modules and the edges of the roofs 26. Similarly, panels 62 and 64 of doors 60 are formed at a predetermined angle with one another, represented by obtuse angle Y in FIG. 5, which angle corresponds to the angle of taper or inclination X between the roof 26 and front end wall 28 on each module. Further, side walls 32 and 36 on the right and left end modules 20 and 22, respectively, are also tapered outwardly and downwardly at an obtuse angle Z (FIG. 4) such that they form inclined surfaces or planar areas extending between the supporting surface and roof edge. Angles X, Y and Z are formed within the range of 100°–115° with all of them being approximately 100° in the preferred embodiment. However, the central or intermediate modules 24 have their downwardly depending side walls 34 extending in a plane which is approximately perpendicular to the planes including the end walls 28 and 30 and roof 26. Similarly, the connecting flanges 38, 40 and 42 on the respective modules also lie in planes which are perpendicular to the planes including respective roofs and end walls on the respective modules.

Accordingly, when it is desired to form a storage enclosure having multiple compartments, several of the modules may be secured together adjacent one another in a row via the connecting flanges and the adjacent side walls. Thus, as shown in FIG. 2, connecting flange 38 will be bolted, pop riveted, or otherwise secured to the side wall 34, while the connecting flange 40 may be secured to a side wall 34 of another central or intermediate module 24 and so on or may be secured to connecting flange 42 of a left hand module 22 with a separate side wall panel 44 being secured therebetween. As will be apparent, side wall panel 44 is necessary to form the final divider or side wall between the last central module 24 and the left end or closing module 22 at the end of the storage enclosure. Consequently, it will be understood that the present invention allows the storage enclosure to be assembled with as many separate compartments as are desired merely by using a right and left-hand module 20 and 22 and including as many central or intermediate modules 24 as are necessary or desired.

Any of the individual modules 20, 22 and 24 may also be used as a single storage enclosure without assembly with any other modules. In this connection, it will be understood that a separate side wall panel 44 will be secured to the open side of which ever module is chosen to be used individually.

Alternatively, if it is desired to use the module permanently as a single storage enclosure, the module may be produced with two downwardly depending side walls, one replacing the connecting flange described above. Then, if it is ever desired to use that individual module in connection with others to form a larger storage enclosure, a portion of one of the side walls may be cut away leaving a connecting flange such as that described above. The resulting module may then be connected via that connecting flange to other modules in the manner described above.

Further, the individual modules including one depending side wall and a connecting flange may also be used singularly in conjunction with a building by securing an individual module alongside a wall of the building, the wall forming the fourth side of the module. The module is secured to the building wall via the connecting flange and any conventional securing means. Thus, the module may be incorporated alongside an existing structure to provide additional storage space either interior or exterior of that structure.

Figure 6:
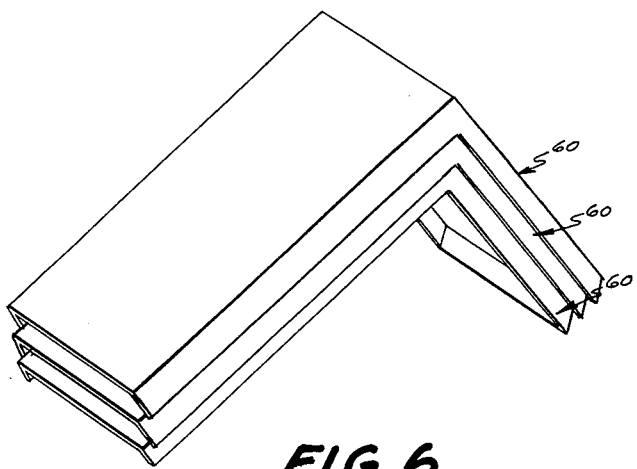
FIG. 6 is a perspective view of a plurality of the individual L-shaped doors of the present invention compactly stacked for storage and/or transportation purposes.
Figure 7:
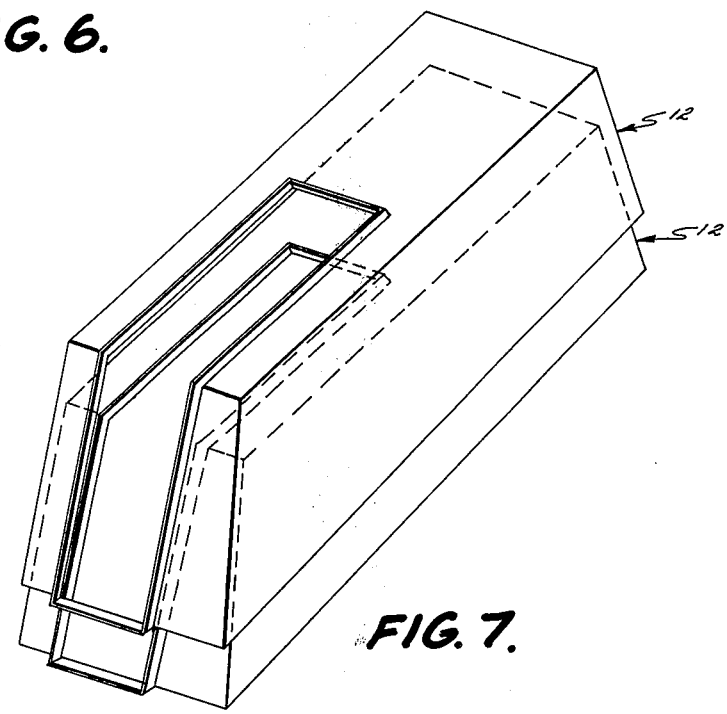
FIG. 7 is a perspective view of a plurality of the individual modules of FIG. 2 compactly stacked for transportation and/or storage purposes.

As mentioned above, in the preferred embodiment, the end walls 28 and 30 on all the modules and the side walls 34 and 36 on the end modules are tapered or inclined between the roofs 26 and supporting surfaces. This tapering allows the stacking of the individual modules for storage and transportation purposes. As shown in FIG. 7, any of the individual modules 12 may be stacked one atop the other when disassembled and thereby take up a minimal amount of space. Similarly, the generally L-shaped doors 60 may be stacked for transportation purposes apart from the modules as shown in FIG. 6. Although the side walls 34 of the central or intermediate modules 24 are generally perpendicular to the planes of the roof and end walls, these side walls 34 may also be flared slightly outwardly to facilitate the stacking in the above described manner. Such a slight flaring does not preclude the combination of the modules into a structure 10 shown in FIG. 1 and does not detract greatly from the overall space available within the interior of the adjacent compartment of the composite storage enclosure 10. Further, the flaring would be substantially less than the taper of inclination of the side walls of the end modules.

It will now be understood that the present novel invention provides a convenient, compact storage enclosure for the prevention of theft, vandalism and destructive effects of weather especially for bicycles, motorcycles and other small items to be stored. The structure is also adapted to store other small vehicles such as snowmobiles and the like. The invention is portable and yet provides a permanent storage enclosure. The modules of the invention may be used either individually or in conjunction with one another to form a larger storage enclosure having separate compartments. Each of the modules is individually accessible without requiring a person entering therein to bend or stoop via a conveniently placed opening or aperture which extends for the full height of the front end wall and into the roof of the module. The generally L-shaped doors may be easily raised when access is desired into the interior of the modules without allowing entrance into adjacent modules. Further, the inclusion of a locking latch apparatus on each of the doors prevents unauthorized entry therein. Finally, individual modules and L-shaped doors may be compactly stacked for storage and transportation purposes, thereby reducing the space and expense required therefor.

While one form of the invention has been shown and described, other forms will now be apparent to those skilled in the art. Therefore, it will be understood that the embodiment shown in the drawings and described above is merely for illustrative purposes, and is not intended to limit the scope of the invention which is defined by the claims which follow.

The embodiments of the invention in which an exclusive property or privilege is claimed are defined as follows:

1. A storage enclosure for bicycles, motorcycles and the like including a roof, front and rear edges, side walls and a fixed end wall depending downwardly from said roof, and means defining an end aperture opposite said fixed rear end wall; said side and fixed end walls having generally coplanar lower edges adapted to support said enclosure on a generally planar supporting surface; said enclosure having an overall length between said front and rear edges slightly greater than the length of a bicycle or motorcycle to be stored therein and a height measured from said lower edges of said fixed end and side walls slightly greater than the height of the highest portion of said bicycle or motorcycle but less than the height of an average adult person straddling or walking adjacent such a bicycle or motorcycle; said end aperture having a width slightly greater than the width of the widest portion of such a bicycle or motorcycle; said end aperture extending into said roof a distance sufficient to allow a person to guide a bicycle or motorcycle entirely into said enclosure for storage therein through said end aperture while straddling or walking adjacent the middle of said bicycle or motorcycle without encountering obstruction from said roof; a closure mounted on said enclosure and movable to expose said end aperture, said closure including first and second closure portions for covering and closing of said end aperture including the portion extending into said roof, said first closure portion extending upwardly and said second closure portion extending outwardly over said aperture when said closure is opened to cover a person standing within said aperture; interlocking flange means outlining said closure and aperture for locating and sealing said closure over said aperture when said closure is closed; and locking means for securing said closure in its closed position over said end aperture.

2. The storage enclosure of claim 1 wherein said aperture extends into said roof a sufficient distance to expose an area vertically over the rear one-half of a bicycle or motorcycle to be stored in said enclosure.

3. A storage enclosure for bicycles, motorcycles, and the like including a roof, front and rear edges, side walls and a fixed end wall depending downwardly from said roof, and an end aperture opposite said fixed end wall; at least one of said side walls and said fixed end wall having generally coplanar lower edges adapted to support said enclosure on a generally planar supporting surface; said enclosure having a maximum length from said front edge to said rear edge slightly greater than that of a bicycle or motorcycle adapted to be received therein; said roof being spaced above said lower edges of said fixed end and side walls a distance slightly greater than the height of a bicycle or motorcycle adapted to be received within said enclosure; said end aperture extending into said roof to a position located at least substantially at the midpoint of said maximum length of said enclosure such that the extremity of said end aperture in said roof is closer to said fixed ennd wall than is the extremity closest to said fixed end wall of the seat closest to said end wall on such a bicycle when such bicycle is received entirely within said enclosure with its front wheel closer to said fixed end wall than its rear wheel; a door; hinge means for hingedly securing said door over said aperture; said door including a flange extending along at least a portion of the periphery thereof and depending therefrom; said enclosure including an integral upstanding flange outlining at least a portion of the periphery of said aperture; said door flange cooperating with and seating over said upstanding flange to seal said aperture.

4. The storage enclosure of claim 3 wherein said end aperture is located in a second fixed end wall opposite said first end wall, has a width less than the width of said second end wall and a height running the entire extent of said second end wall and merging into a continuation of said end aperture in said roof such that said overall end aperture is generally L-shaped.

5. The storage enclosure of claim 3 wherein said side and end walls taper outwardly from the areas at which they merge into said roof; said tapered walls providing a means for compactly stacking a plurality of said individual modules during transportation and non-use.

6. The storage enclosure of claim 3 wherein said door includes at least two sections extending at a predetermined angle with one another that said door is generally L-shaped.

7. The storage enclosure of claim 3 wherein said enclosure includes at least one biased strut pivotally secured between said door and another portion of said enclosure; said strut adapted to approximately counterbalance said door and to slightly bias said door toward its open position; said door including a locking latch means for locking said door in its closed position.

8. A storage enclosure for bicycles, motorcycles, and the like including a roof, front and rear edges, side walls and a fixed end wall depending downwardly from said roof, and an end aperture opposite said fixed end wall; at least one end of said side walls and said fixed end wall having generally coplanar lower edges adapted to support said enclosure on a generally planar supporting surface; said enclosure having a maximum length from said front edge to said rear edge slightly greater than that of a bicycle or motorcycle adapted to be received therein; said roof being spaced above said lower edges of said fixed end and side walls a distance slightly greater than the height of a bicycle or motorcycle adapted to be received within said enclosure said end aperture extending into said roof to a position located at least substantially at the midpoint of said maximum length of said enclosure such that the extremity of said end aperture in said roof is closer to said fixed end wall than is the extremity closest to said fixed end wall of the seat closest to said end wall on such a bicycle when such bicycle is received entirely within said enclosure with its front wheel closer to said fixed end wall than its rear wheel; a door; hinge means for hingedly securing said door over said aperture; said door including at least two sections extending at a predetermined angle with one another such that said door is generally L-shaped, and a peripheral flange depending downwardly therefrom; said enclosure including an integral upstanding flange outlining the periphery of said aperture; said peripheral door flange being tapered slightly outwardly and cooperating with and seating over said upstanding flange to seal said apertures; said slight taper providing a means for compactly stacking a plurality of said L-shaped doors apart from said enclosures during transportation and non-use.

9. A storage enclosure for bicycles, motorcycles, or the like comprising a plurality of elongated, separate storage units secured together in side-by-side relationship, each unit having at least one entrance aperture allowing entrance into only the unit associated therewith, a door hingedly secured in closing relationship to said entrance aperture, a roof portion having a pair of opposing side edges, a first end portion, a second end portion opposite said first end portion, one of said end portions including said entrance aperture; at least one side means for forming a side wall extending downwardly from said roof portion from one side edge thereof and between said first and second end portions, at least one flange extending downwardly from said roof portion along the other side edge thereof opposite said one side edge; securing means on said one flange for securing side wall means which extend downwardly from said one flange and between said first and second end portions for separating the entire length of said unit from any adjacent storage unit or structure; said structure of each unit preventing entrance into any unit or units on one or both sides thereof regardless of whether the door is opened or closed; means on at least one side edge of said roof portion adapted for securing the unit including said roof portion and another storage unit in side-by-side relationship; at least a portion of the peripheral boundary of said entrance aperture being defined by an outwardly extending flange which cooperates with said door; said door including a depending flange along at least a portion thereof which fits over said aperture flanges for cooperation therewith to close and seal said entrance.

10. The storage enclosure of claim 9 wherein said side wall means includes a separate panel member extending downwardly between said units.

11. The storage enclosure of claim 9 wherein said side wall means includes a side portion of another of said plurality of elongated storage units.

12. A storage enclosure for bicycles, motorcycles, or the like comprising a plurality of elongated, separate storage units secured together in side-by-side relationship, each unit having an entrance aperture allowing entrance into only the unit associated therewith, the structure of each unit preventing entrance into the remaining unit or units; each of said units including a roof portion, a closed end portion, an end portion opposite said closed end portion, said opposite end portion including said entrance aperture, a door hingedly secured over said entrance aperture, at least one side portion extending downwardly from said roof portion from one side edge thereof and extending between said closed and opposite end portions, and at least one flange extending downwardly from said roof portion along the side edge thereof opposite said one side edge, said flange on said roof adapted to engage a separate panel to form said unit into an enclosure; at least portions of the peripheral boundary of said entrance aperture being defined by outwardly extending end flanges which converge toward one another for cooperation with said door; said door including diverging, depending flanges which flare outwardly to fit over said end flanges for cooperation therewith to close and seal said entrance; at least said opposite end portion being inclined outwardly and downwardly from the end of said roof portion to allow easier insertion of said bicycle, motorcycle, or the like into the interior of said enclosure.

13. The storage enclosure of claim 12 wherein said separate panel is a side portion of another of said plurality of elongated storage units.

14. The storage enclosure of claim 12 wherein said separate panel is a panel separate from any portion of said plurality of storage units and separate from said roof, end and remaining side portions of said unit.

15. The storage enclosure of claim 12 wherein said opposite end portion is inclined from said roof to said surface supporting said enclosure; said closed end portion also being inclined outwardly and downwardly from one end of said roof portion to said supporting surface whereby said enclosure has an overall longitudinal cross-sectional shape of a trapezoid.

16. The storage enclosure of claim 12 wherein said entrance aperture has a width less than that of said opposite end wall and extends at least from said end of said roof portion to the bottom of said opposite end wall.

17. The storage enclosure of claim 12 wherein said aperture in said end wall merges with an aperture in said roof extending parallel to the direction of elongation of said roof to a position located at least at the midpoint of the maximum length of said enclosure; said door comprising integral panels secured together and extending at a predetermined angle with one another such that said door is generally L-shaped; said door being hingedly secured to said roof adjacent said aperture therein and opening generally vertically.

* * * * *